(No Model.)
D. D. C. PILLSBURY.
HEEL TRIMMING MACHINE.
No. 417,835. Patented Dec. 24, 1889.
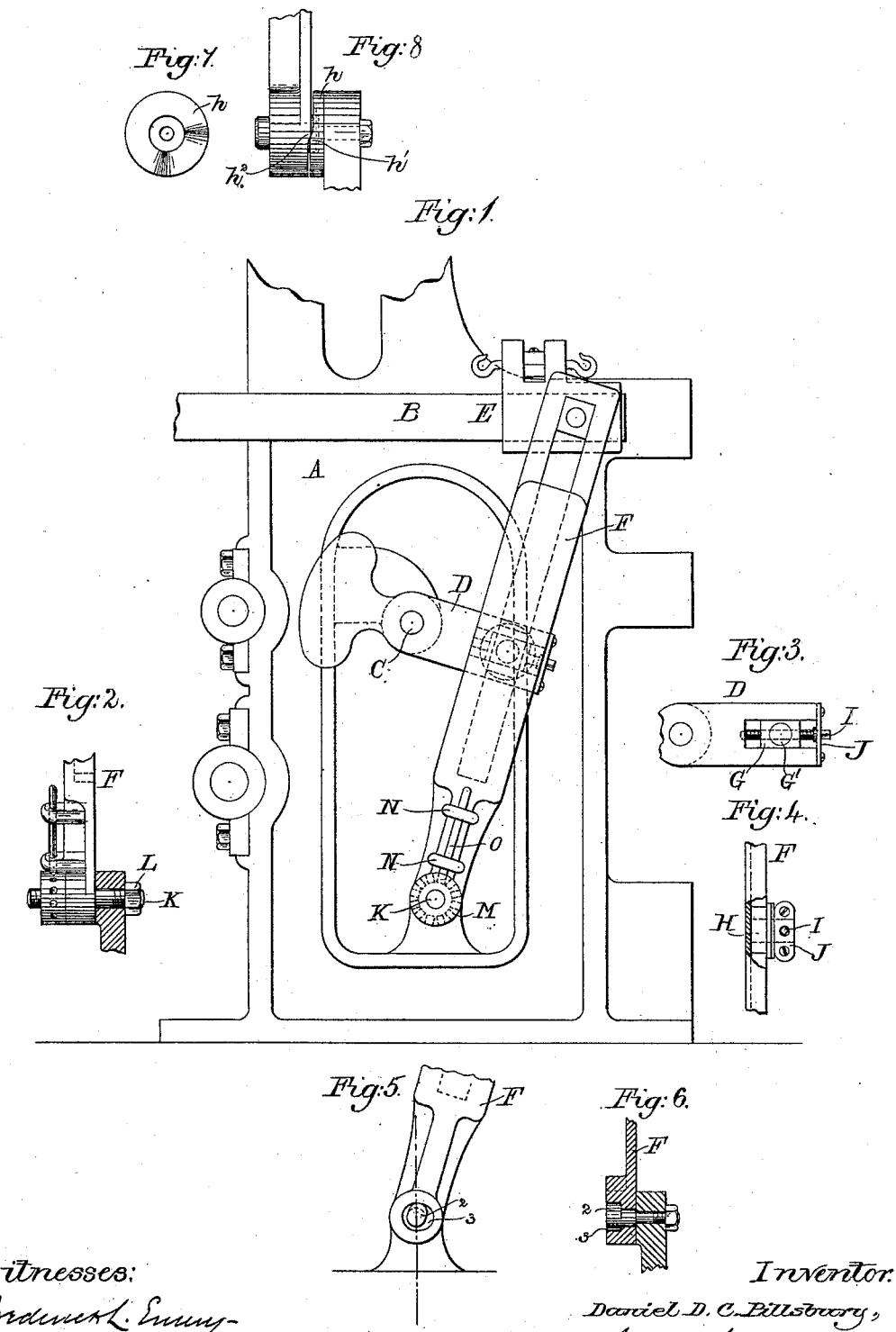
Witnesses:
Frederick L. Emery
Edgar A. Goddin
Inventor:
Daniel D. C. Pillsbury,
by Crosby & Gregory
Attys.

UNITED STATES PATENT OFFICE.

DANIEL D. C. PILLSBURY, OF LYNN, ASSIGNOR TO JAMES W. BROOKS, TRUSTEE, OF CAMBRIDGE, MASSACHUSETTS.

HEEL-TRIMMING MACHINE.

SPECIFICATION forming part of Letters Patent No. 417,835, dated December 24, 1889.

Application filed August 7, 1889. Serial No. 320,008. (No model.)

*To all whom it may concern:*

Be it known that I, DANIEL D. C. PILLSBURY, of Lynn, county of Essex, State of Massachusetts, have invented an Improvement in Heel-Trimming Machines, of which the following description, in connection with the accompanying drawings, is a specification, like letters on the drawings representing like parts.

This invention has for its object to improve the class of heel-trimming machines represented in United States Patent No. 166,795, dated August 17, 1875. In the machines described in the patent referred to the trimming-lever is moved forward during the trimming operation, the lever under strain completing its forward movement about as the heel is trimmed, and as the lever completes its stroke at speed it is liable to fracture or strain or go too far by momentum, and especially when the machine from long use becomes worn. To obviate the overrunning of the trimming-lever, I have provided the machine with a clamp, which is automatic in its action as the lever completes its return-stroke, a heel having been trimmed, the clamp being opened to relieve the said lever, when the latter is again started in its forward direction to trim a heel.

My invention consists in the combination, with a vibrating lever of a heel-trimming machine, of a co-operating clamp to check the vibration of the lever at the end of its stroke after having trimmed a heel and returned to its normal condition or starting-point.

Figure 1 in side elevation represents a sufficient part of a heel-trimming machine with my improvements added to enable my invention to be understood. Figs. 2, 3, and 4 are details to be referred to; and Figs. 5, 6, 7, and 8 modifications to be referred to.

The frame-work A, the guide B, the trimmer-shaft C, the weighted crank D, the carriage E, mounted on the said track, the slotted trimmer-lever F, the block G, carrying the crank-pin G', and the slide-block H in the groove of the trimmer-lever to receive the said crank-pin are and may be all as usual. I have made the block G adjustable on the arm D by the adjusting-screw I, which is held in the plate J against longitudinal movement, but is permitted to rotate freely. The trimmer-lever F is pivoted upon a stud K, secured to the frame side, as herein shown, by a nut L, the outer end of the said stud being screw-threaded and receiving upon it a nut M, the nut and screw constituting one form of clamp. The said lever F is shown as having ears N, through which is passed an actuating device O, (shown as a pin,) which enters one of the series of holes or notches in and to move the said nut.

In Figs. 1 and 2 the actuating device is shown as entering or engaging the nut M, the lever F being in its normal position, ready to be moved to trim a heel. In this condition the actuating device in engagement with the nut has turned the latter on the screw-stud in a direction to clamp the said lever F. When the lever F is started from the position, Fig. 1, toward the left, the nut is turned with it to release the clamp and free the pressure of the nut from the said lever.

In Figs. 5 and 6 the stud has on it a cam, as 2, and the lever F turns freely on the stud, but has an oblong opening or recess 3 for the cam 2, so that when the lever arrives in a certain position the cam 2 will bind in the recess and constitute a clamp.

In Figs. 7 and 8 a hub or plate 8 has a surface in two planes connected by an incline $h'$ and the lever has a like surface connected by an incline $h^2$, the said surfaces when the lever comes back to its normal position acting to move the lever slightly laterally to bind or clamp it and prevent further movement.

In all these instances the part co-operating with the lever is adjustable to clamp more or less tightly and compensate for wear.

I claim—

1. In a heel-trimming machine of the class described, the combination, with a vibratory lever, of an intermittingly-acting friction-clamp located at the pivotal point thereof and adapted to be automatically operated by the movement of said lever to check the vibration of the same as it approaches the end of its stroke in one direction, substantially as described.

2. The combination, with a vibratory lever and its stud forming a pivot therefor, of an adjustable clamp M, provided with notches, carried upon the pivot of and actuated by said lever, to thereby check the vibration of the same at the end of its stroke in one direction, and a pin O, carried by the lever and adapted to enter one of the notches of the clamp, substantially as described.

3. The lever F and the stud forming the pivot for the lever and nut, combined with means to connect to and to turn the said nut by the lever, as described, to clamp or release the said lever, as and for the purposes set forth.

In testimony whereof I have signed my name to this specification in the presence of two subscribing witnesses.

DANIEL D. C. PILLSBURY.

Witnesses:
GEO. W. GREGORY,
FREDERICK L. EMERY.